(No Model.)
W. S. FURNAS.
APPARATUS FOR KILLING POULTRY.
No. 487,180. Patented Nov. 29, 1892.
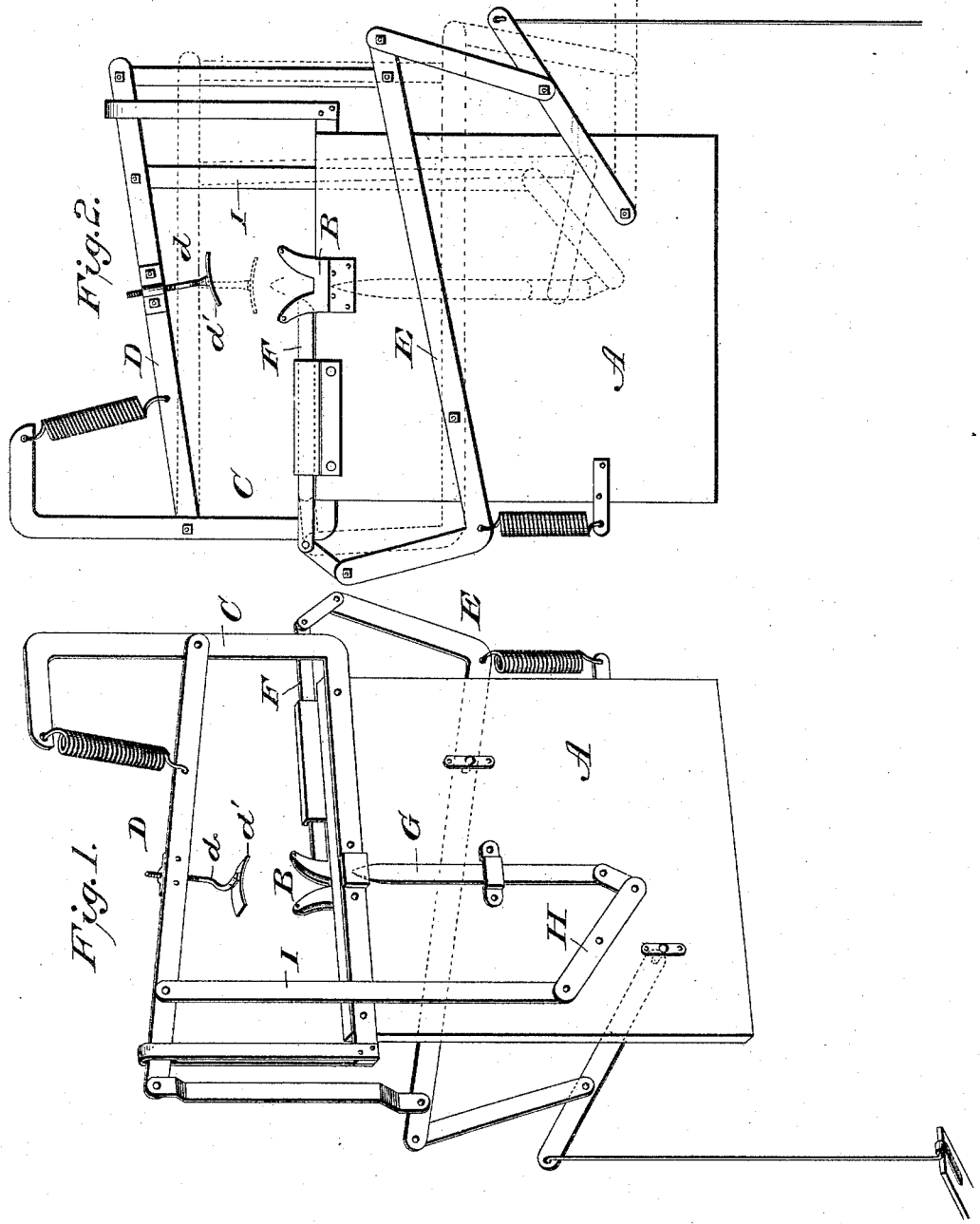
WITNESSES
Walter S. Furnas.
INVENTOR
by 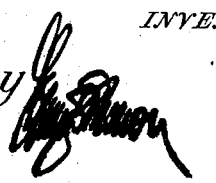
Attorney

UNITED STATES PATENT OFFICE.

WALTER S. FURNAS, OF LISBON, IOWA.

APPARATUS FOR KILLING POULTRY.

SPECIFICATION forming part of Letters Patent No. 487,180, dated November 29, 1892.

Application filed January 28, 1892. Serial No. 419,574. (No model.)

*To all whom it may concern:*

Be it known that I, WALTER S. FURNAS, a citizen of the United States of America, residing at Lisbon, in the county of Linn and State of Iowa, have invented certain new and useful Improvements in Apparatus for Killing Poultry; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in apparatus for killing poultry.

The object of the invention is to provide a device having a lance for severing the arteries to properly bleed the fowl and a knife or blade for puncturing the brain to cause instant death and an effect upon the nervous system of the fowl which causes a relaxation of the feathers; and the invention consists in the employment of a frame or holder to receive the head of the fowl and severing and puncturing devices, as will be hereinafter fully set forth, and particularly pointed out in the claims.

In the accompanying drawings, forming part of this specification, Figure 1 shows a device constructed with a view of carrying out my improvement. Fig. 2 is an elevation of the same, different positions of the knives being indicated in full and dotted lines.

A designates a suitable support, to which a fork B is secured, said fork being adapted to receive and hold the head of the fowl in position. To this support is attached an angle-bar C, to one of the upright portions of which is pivoted a lever D, connected with any suitable means for depressing the same, said lever being also connected to a bell-crank lever E, connected by a link to a horizontal reciprocating knife or lance F, which is guided to move across the extended ends of the fork B.

G designates a knife, which is connected to a rocking lever H, pivoted to the support, and is preferably connected to the lever D by a rod I, as shown. Springs are connected to the levers D and E for returning them to a normal position, so as to retract the knives F and G beyond the fork B. The lever D carries above the fork an adjustable arm *d* with a curved plate *d'*, which when the lever is depressed bears upon the head of the fowl and holds the head while the knife or lance G punctures the brain, severing the medulla oblongata, and the knife or lance F severs the arteries of the throat to insure a thorough bleeding.

The construction of the device may be varied and the knives operated by different mechanical devices than those herein shown, the essential features of my invention being set forth in the claims.

With this device poultry may be killed more humanely, as it acts positively and there is no liability of torturing the fowl. All kinds of poultry can be killed with the apparatus, so that they can be dry-picked for the market, and the element of cruelty usually accompanying the operation is eliminated.

Having thus described my invention, what I claim as new, and desire to secure by Letters Patent, is—

1. In a device for killing poultry, the combination, with a horizontal curved holder, of knives or lances arranged at angle with each other below the holder and mechanism for reciprocating said knives, for the purpose set forth.

2. In a device for killing poultry, the combination, with a movable holder and a stationary fork located beneath the same, of reciprocating knives adapted to be moved beyond the stationary fork to sever the neck of the fowl, substantially as shown.

3. The combination, with the fork B and movable holder, of knives or lances and means for reciprocating in unison the knives when the holder is depressed, for the purpose set forth.

4. In a device for killing poultry, the combination, with the vertical and horizontal reciprocating knives located in different planes, of a forked holder beyond which said knives pass, a retaining-plate above the holder, and means for operating the knives and retaining-plate, substantially as shown, and for the purpose set forth.

In testimony whereof I affix my signature in presence of two witnesses.

WALTER S. FURNAS.

Witnesses:
GEORGE O. RUNKLE,
HENRY BUCHER.